April 8, 1969 M. H. BACON 3,437,545
PLYWOOD ASSEMBLY APPARATUS
Filed July 20, 1965
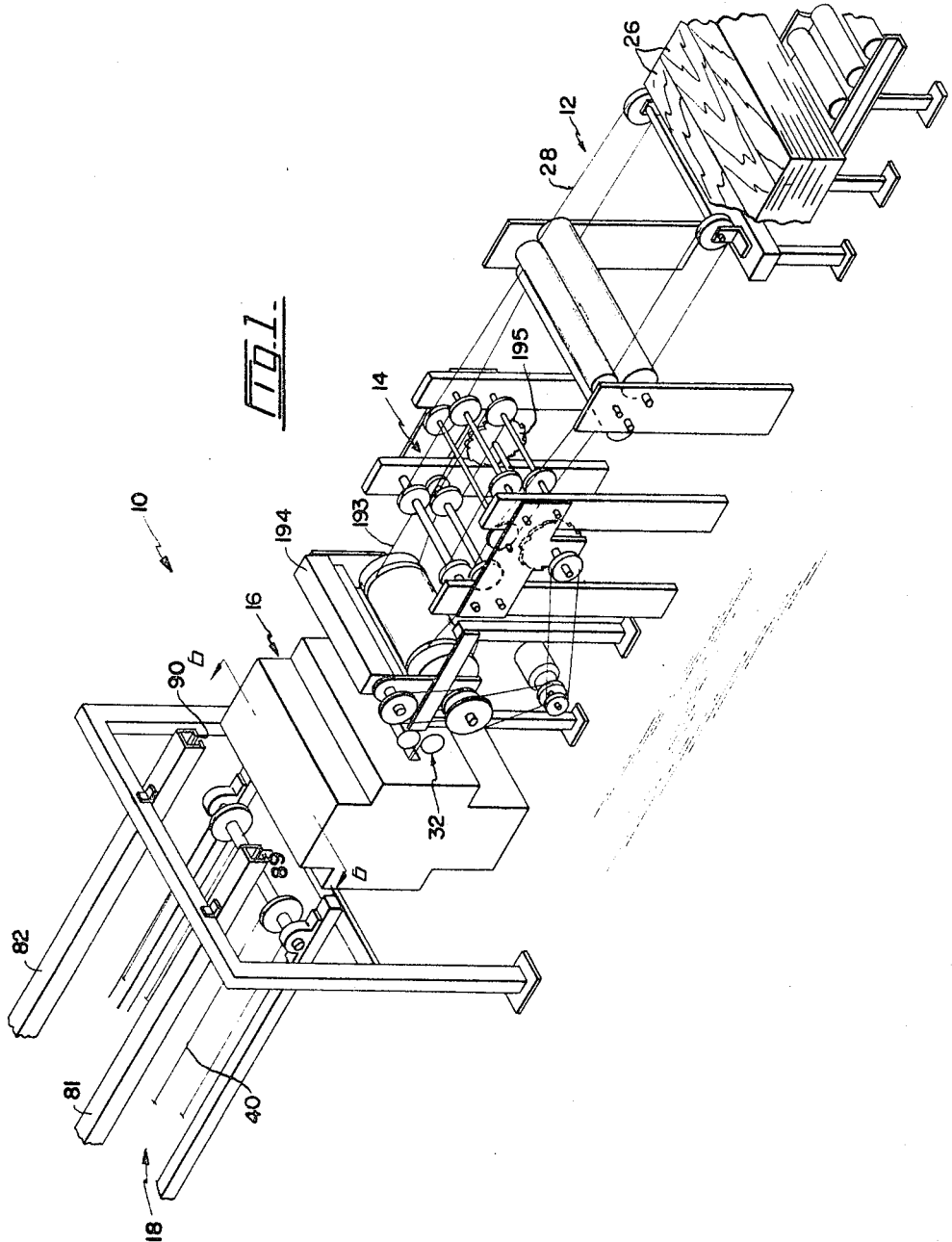
INVENTOR
MERLE H. BACON

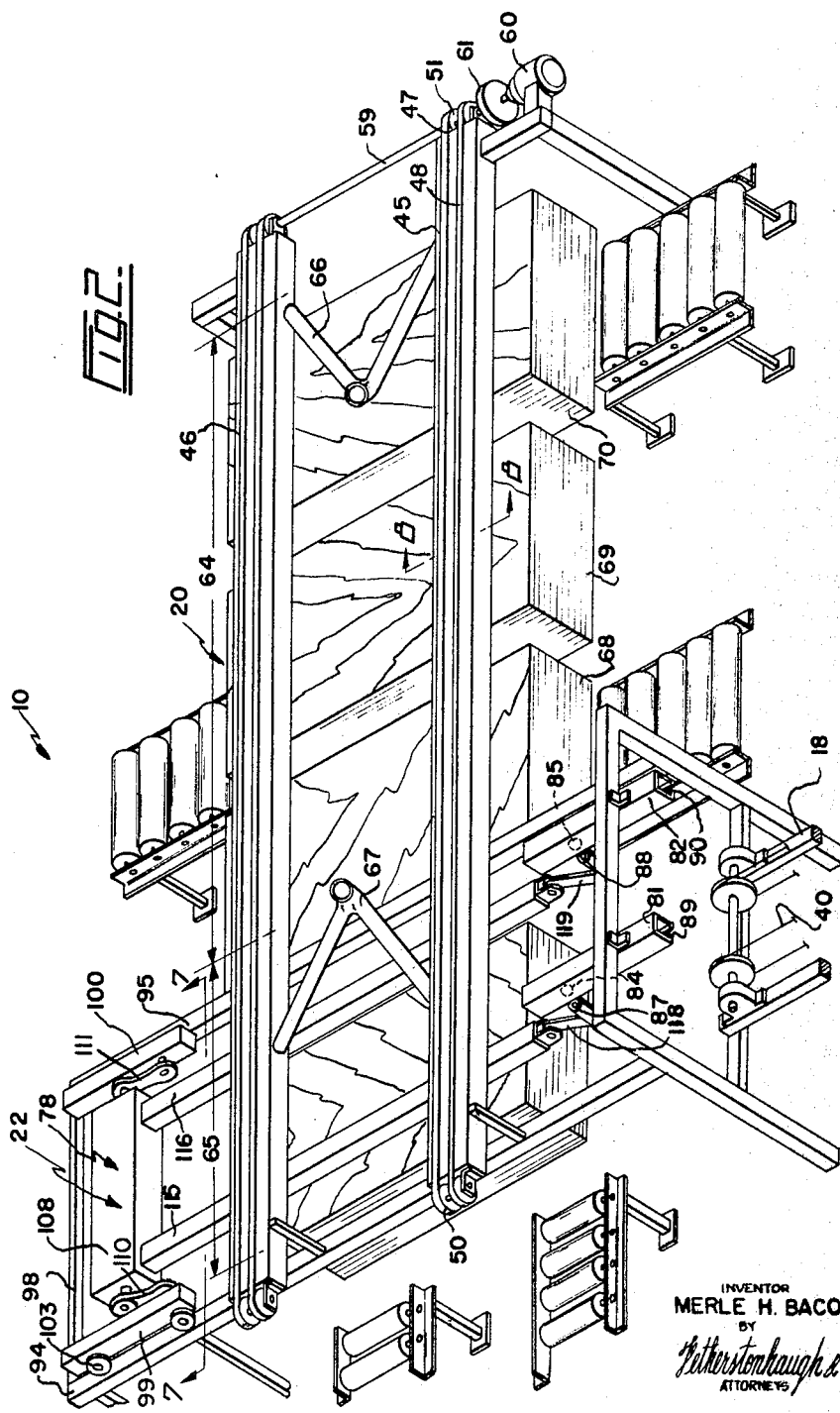

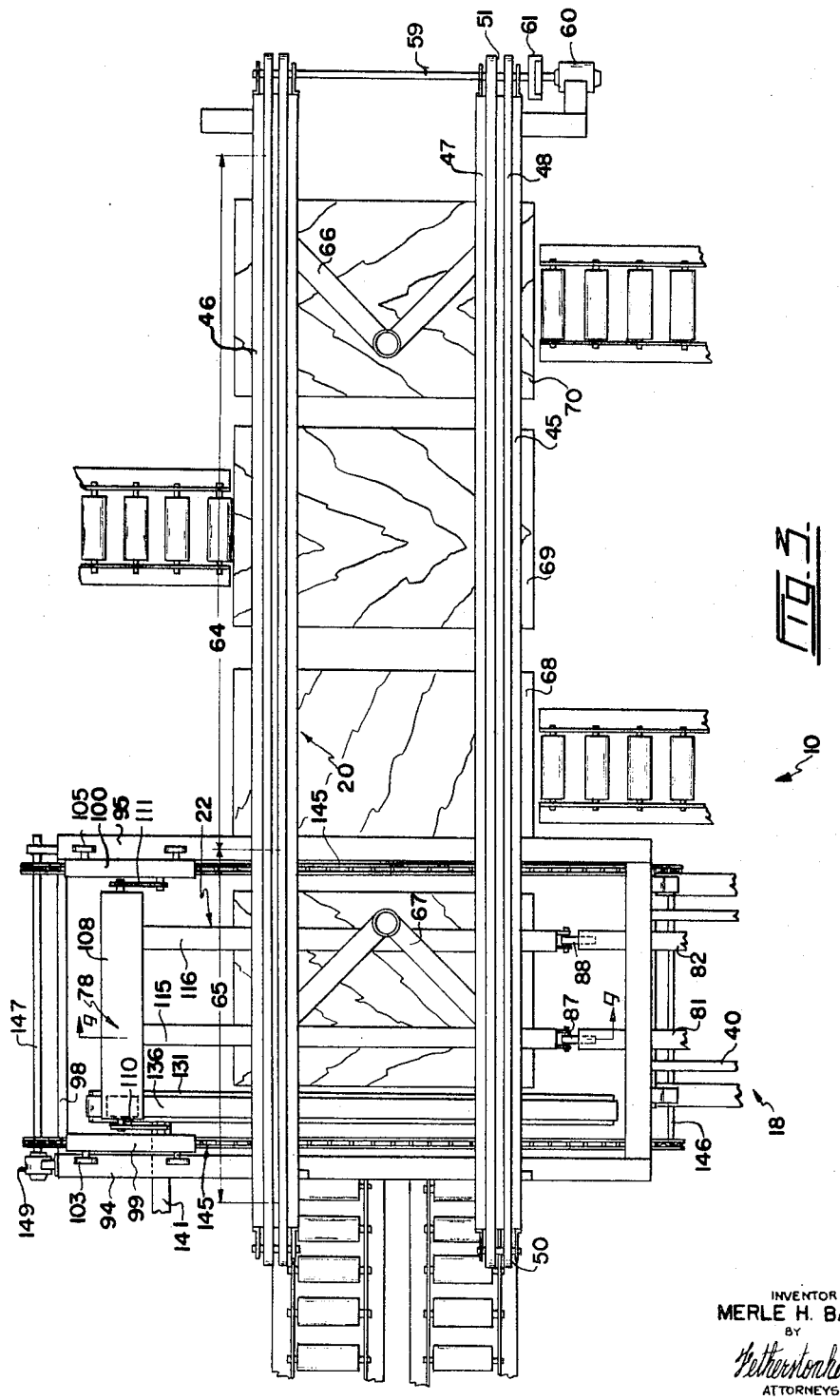

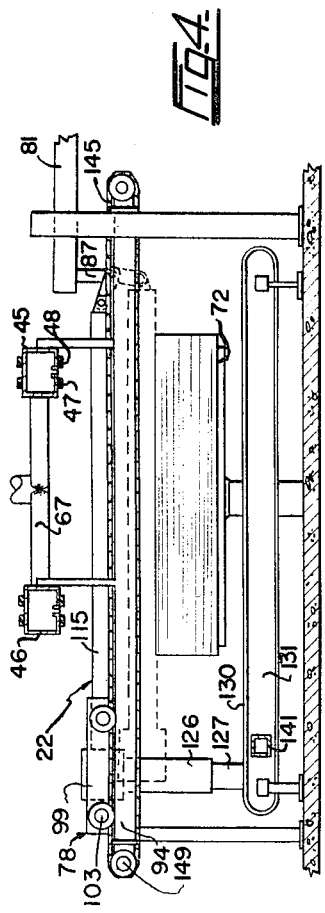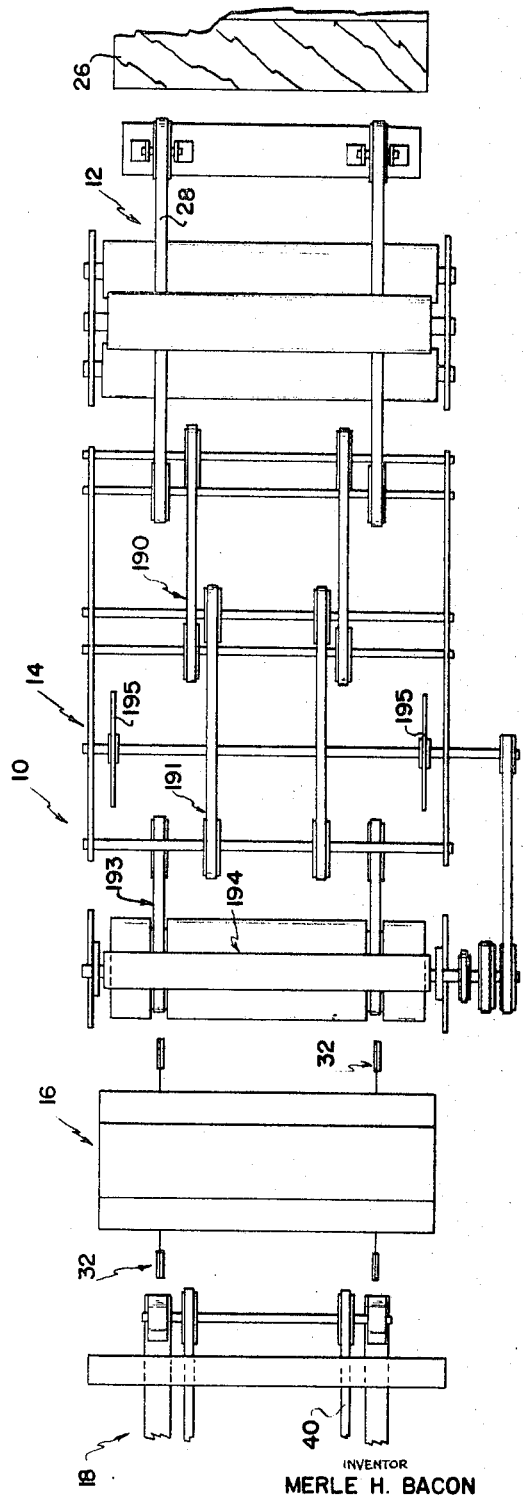

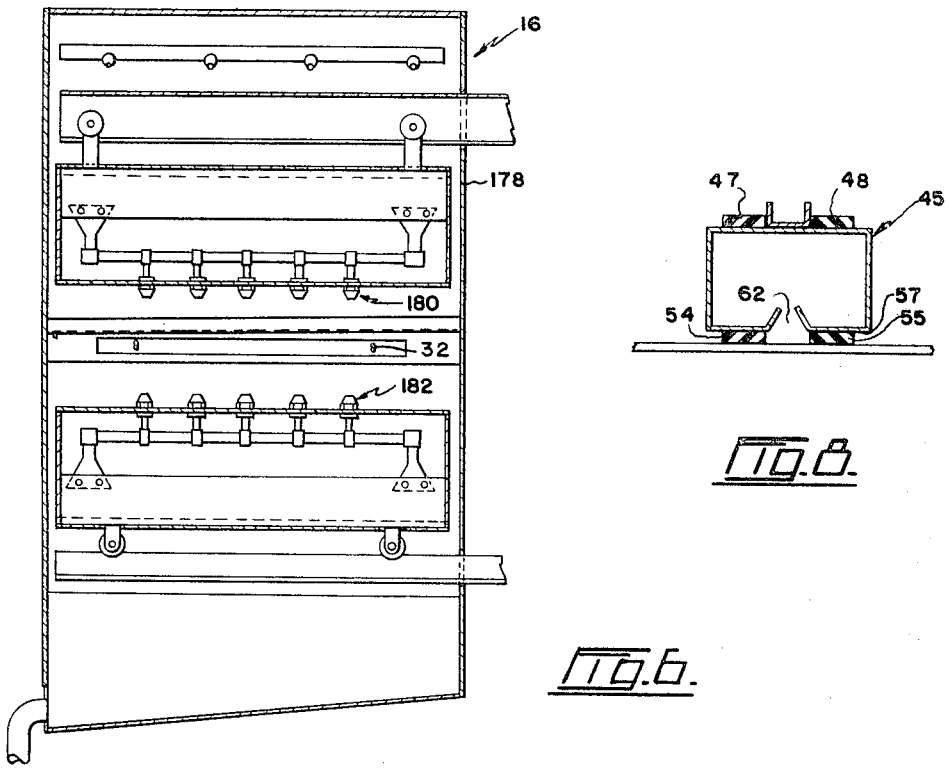
FIG. 6.
FIG. 8.
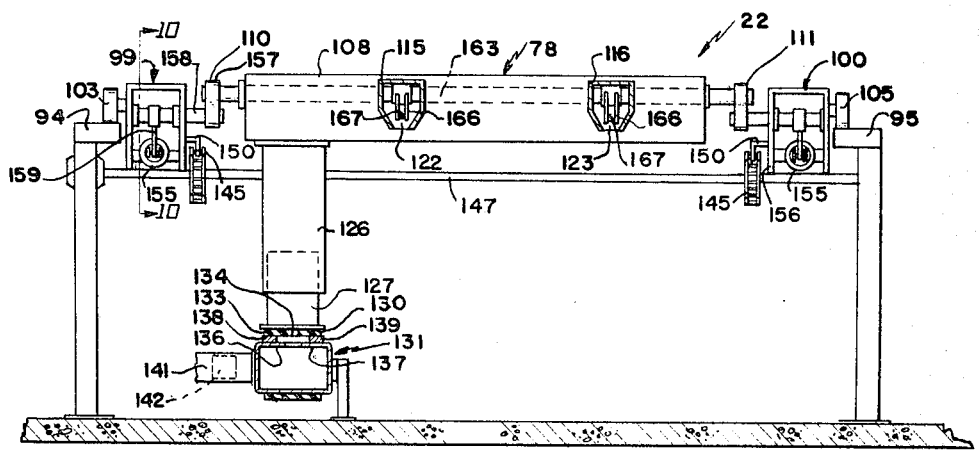
FIG. 7.

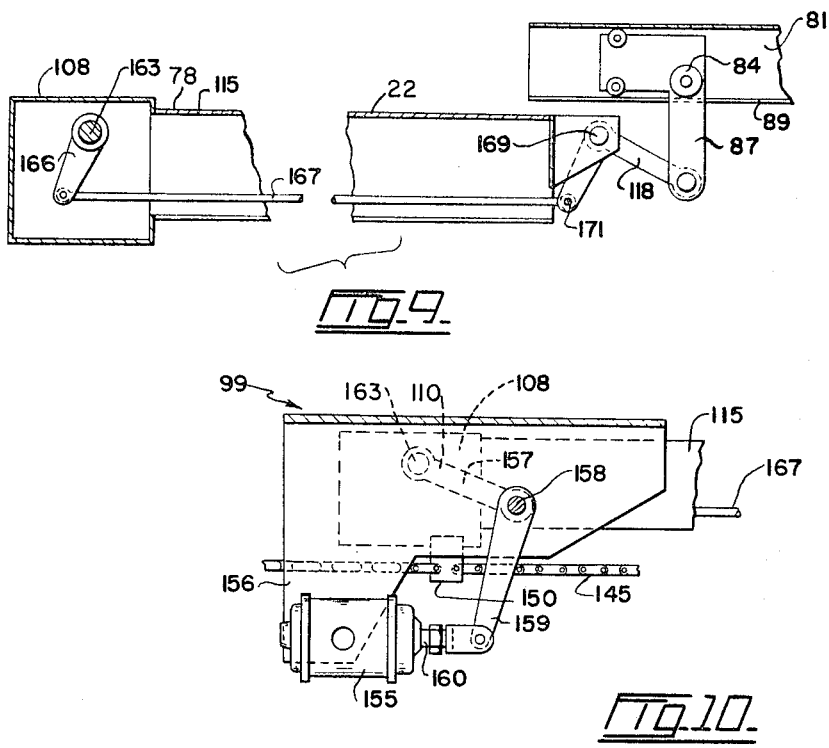

United States Patent Office 3,437,545
Patented Apr. 8, 1969

3,437,545
PLYWOOD ASSEMBLY APPARATUS
Merle H. Bacon, South Burnaby, British Columbia, Canada, assignor to MacMillan Bloedel Limited, a corporation
Filed July 20, 1965, Ser. No. 473,407
Int. Cl. B32b *31/10, 21/14*
U.S. Cl. 156—557                    18 Claims

ABSTRACT OF THE DISCLOSURE

Apparatus for consecutively delivering veneer sheets to a first assembly station, assembling cross-banding core pieces into core sheets at a second assembly station to one side of the first station, shifting said assembled core sheets on to the veneer sheets at the first station alternately to the delivery of the veneer sheets thereto, and applying glue to opposite faces of the core pieces before said pieces reach the first station.

---

This invention relates to apparatus for assembling veneer sheets and crossbanding core pieces in the manufacture of plywood.

During the manufacture of plywoor panels, crossbanding sheets are alternately arranged with veneer sheets. In many cases, each crossbanding sheet is made up of core pieces of random widths placed edge to edge. Prior to this invention, the crossbanding core pieces with glue applied to opposite faces thereof have usually been placed by hand side by side on a veneer sheet, after which another veneer sheet is laid on to the core pieces. This manual operation is slow, and results in a waste of material since it is often necessary to break pieces off crossbanding core pieces to make a layer of a desired length.

The present plywood assembly apparatus includes a first conveyor for consecutive delivering veneer sheets to an assembly station. A second conveyor usually operating substantially at right angles to the first conveyor consecutively delivers crossbanding core pieces to the veneer sheets at the assembly station alternatively to the delivery of said sheets thereto. A preferred form of the apparatus includes means for forming crossbanding pieces into sheets by arranging the core pieces of each sheet in edge to edge relationship, trimming each crossbanding sheet to a desired size, applying glue to opposite faces of said sheet, and then delivering the glued sheet to the veneer sheets at the assembly station.

An example of this plywood assembly apparatus is illustrated in the accompanying drawings, in which, FIGURE 1 is a diagrammatic perspective view of the portion of the apparatus which feeds in and prepares the crossbanding core pieces, FIGURE 2 is a diagrammatic perspective view of the portion of the apparatus which feeds in the veneer sheets, and assembles the veneer and core sheets.

FIGURE 3 is a plan view of the apparatus of FIGURE 2.

FIGURE 4 is a side elevation of the apparatus of FIGURE 2,

FIGURE 5 is a plan view of the apparatus illustrated in FIGURE 1,

FIGURE 6 is a vertical cross section taken on the line 6—6 of FIGURE 1, showing the glue spraying apparatus, FIGURE 7 is an enlarged section taken on the line 7—7 of FIGURE 2, FIGURE 8 is an enlarged section taken on the line 8—8 of FIGURE 2, FIGURE 9 is an enlarged fragmentary longitudinal section through a carriage alone which shifts the crossbanding core pieces on to the veneer sheets, taken on line 9—9 of FIGURE 3, and FIGURE 10 is an enlarged vertical section taken on the line 10—10 of FIGURE 7.

Referring to the drawings, 10 is a preferred form of plywood assembly apparatus including a crossbanding core piece feed section 12, a trimming section 14, a gluing unit 16, a crossbanding sheet holding section 18, a veneer sheet conveyor 20, and a core piece sheet conveyor 22. These are all more or less diagrammatically illustrated in FIGURE 1 and 2, in order to show their relationship to each other.

Crossbanding core pieces 26, usually of different widths are placed either automatically or by hand in feed section 12 which has a conveyor 28 over which the pieces are moved. The core pieces preferably are not glued together. The core pieces are fed into the crowding and trimming section 14 where they are crowded together into a substantially continuous strip or sheet, said assembled pieces being cut into sheets of desired widths and lengths, these depending upon the dimensions of the plywood being manufactured. If the ultimate plywood is made 4 x 8 foot panels, the core pieces are trimmed into sheets a little more than 4 feet wide and 8 feet long. The trimmed core sheets are carried through gluing unit 16 by a suitable conveyor 32, where glue is applied to the upper and lower surface of each sheet. Conveyor 32 directs the glued core sheets into holding section 18 which includes an endless conveyor 40 therein upon which the assembled core sheets lie one at a time. This conveyor acts as a table or station from which the core pieces are picked up in their respective sheets.

Veneer sheet conveyor 20 is made up of identical tubes 45 and 46. As these tubes and their associated elements are the same, only one, namely tube 45, will be described in detail. This tube has belts 47 and 48 extending therearound in a longitudinal direction, said belts running around pulleys 50 and 51 at opposite ends of the tube. Belts 47 and 48 have lower runs 54 and 55 which extend over the lower surface 57 of the tube, see FIGURE 8. Pulleys 51 are fixedly mounted on a shaft 59 which is rotated by a siutable source of power, such as a standard electric motor 60, said motor being connected to the shaft by an electric clutch brake 61. A narrow slot 62 is formed in the lower surface 57 of tube 45 between belt runs 54 and 55. It is possible to use a single wide perforated or loosely woven belt that spans slot 62, in place of two separate belts extending along the sides of said slot.

Tubes 45 and 46 are divided into sections 64 and 65 adjacent opposite ends thereof, see FIGURES 2 and 3. Continuous suction during operation of the apparatus is maintained on section 64 of the tubes by a pipe 66 connected to a suitable suction pump, not shown, while interrupted suction is maintained on section 65 by a pipe 67 connected to a suction pump and control means, not shown.

One or more stacks of veneer sheets are positioned beneath conveyor tubes 45 and 46 at section 64 thereof. In this example, there are three stacks of sheets 68, 69 and 70 located side by side. Each of these stacks is preferably mounted on an elevator of the type which moves upwardly each time a sheet is removed from the top of the stack until stopped by a limit switch, not shown, set below the lower runs 54 and 55 of belts 47 and 48 a suitable distance, for example, about 3 inches. This in effect operates, as the sheets are removed, to keep the load at a constant distance from the belts and tubes. Stacks 68, 69 and 70 are located to one side of layer holding section 18, and a table or elevator 72 is aligned with said section 18 beneath conveyor 20, see FIGURE 4. This table or elevator 72 is operated to move downwardly approximately the thickness of one sheet when a veener sheet is placed thereon.

When a veneer sheet from one of the stacks 68, 69 or 70 is pressed against the lower runs 54 and 55 of the belts extending around the tubes 45 and 46, the suction in section 64 of these tubes causes the sheet to be held against these lower runs. The belts move this sheet over table 72, at which time, the suction is cut off from section 65 in order to deposit the sheet on to said table.

Conveyor 22 includes track means associated with a carriage 78. The track means includes a pair of hollow rails 81 and 82 mounted above and extending longitudinally of conveyor 40 in holding section 18. Rollers 84 and 85 ride in rails 81 and 82, respectively, and have hangers 87 and 88 extending downwardly through slots 89 and 90 formed in the bottoms of said rails, see FIGURES 2 and 9.

Another pair of rails 94 and 95 are mounted beneath tubes 45 and 46 and extend substantially at right angles thereto, said rails 94 and 95 being spread apart a distance greater than the distance between rails 81 and 82. Adjacent ends of rails 94–95 and 81–82 overlap, see FIGURE 2, and said rails are substantially parallel to each other. Carriage 78 has a cross bar 98 at one end thereof to the ends of which are connected supporting members 99 and 100 which lie over rails 94 and 95. Supporting member 99 has rollers 103 rotatably mounted thereon and riding on rail 94, while supporting member 100 has rollers 105 rotatably mounted thereon and riding on rail 95.

A base 108 extends transversely of carriage 78 between members 99 and 100 adjacent bar 98 and is suspended at its ends from said members by cranks 110 and 111. A pair of tubes 115 and 116 are connected to base 108 and project forwardly therefrom and terminate beneath ends of rails 81 and 82 when base 108 is positioned near outer ends of rails 94 and 95. Links or bell cranks 118 and 119 swingably connect inner ends of tubes 115 and 116 to hangers 87 and 88 so that the inner ends of tubes 115 and 116 are suspended from rails 81 and 82.

Tubes 115 and 116 have narrow slots 122 and 123 formed in their lower surfaces and extending longitudinally thereof, see FIGURE 7. Base 108 is hollow and communicates with the interiors of tubes 115 and 116. Suction is intermittently applied to tubes 115 and 116 during operation of the apparatus. Telescopic pipe sections 126 and 127 are connected at their upper ends to carriage base 108 and at their lower ends to an endless belt 130 which extends around an open-topped main suction tube 131, see FIGURES 4 and 7. Belt 130 extends longitudinally of tube 131 and has an upper run 133 which closes the top of said tube and to which pipe section 127 is connected, said belt having an opening 134 therein in registry with pipe section 127. Longitudinal flanges 136 and 137 extend inwardly from the side walls of tube 131 and over the top of the latter, and run 133 of belt 130 rides on seal strips 138 and 139 mounted on said flanges 136 and 137, see FIGURE 7. A pipe 141 extends outwardly from a side of tube 131 to a suction pump, not shown. Suitable controls, indicated at 142 in FIGURE 7, are provided for cutting off the suction from tube 131 and, consequently, carriage tubes 115 and 116 when desired.

Tube 131 is of such length and is so located that carriage 78 can move from the position shown in FIGURE 2 with the free ends of tubes 115 and 116 located near ends of rails 81 and 82 to a position with said tubes extending completely over conveyor 40 in holding section 18 while a vacuum is maintained in the carriage tubes. As the carriage 78 is reciprocated longitudinally thereof, belt 133 rides back and forth along tube 131. When the carriage is moved up and down, telescopic pipe sections 126 and 127 move relative to each other without coming apart.

Carriage 78 is reciprocated in any suitable manner. In this example, chains 145 extend around sprockets mounted on spaced shafts 146 and 147, see FIGURE 3, and said shaft 147 is turned by a motor, such as a reversible hydraulic motor 149. Chains 145 are connected to members 99 and 100 of carriage 78 by lugs 150, see FIGURE 7.

Carriage tubes 115 and 116 are raised and lowered by air cylinders 155 swingably carried by brackets 156 depending from support members 99 and 100, see FIGURES 7 and 10. As these cylinders and their associated elements are identical, only one will be described in detail, this being cylinder 155 carried by the bracket 156 depending from member 99. Crank 110 includes an upper arm 157 fixedly mounted on a stub shaft 158 journalled in member 99, see FIGURE 7, and a lower arm 159 fixedly connected to and depending from said shaft within member 99. Piston rod 160 of cylinder 155 is connected to the lower end of crank arm 159. The outer or upper end of crank arm 157 is fixedly secured to an end of a shaft 163 journalled in carriage base 108 and extending across said base to the opposite crank 111 which is mounted on support member 100.

A pair of links 166 are fixed to and hang down from shaft 163 opposite to ends of tubes 115 and 116. Connecting rods 167 are pivotally secured to the lower ends of links 166 and extend through tubes 115 and 116 to bell cranks 118 and 119, see FIGURE 9. Each bell crank is swingably mounted on tube 115 or 116 at 169. Each rod 167 is connected to an inner end 171 of a crank 118 or 119, the outer end 172 of said crank being connected to hanger 87 or 88.

When cylinder 155 extends piston rod 160, cranks 110 and 111 are rotated to lower shaft 163, thereby lowering the adjacent end of carriage 78. At this time, the lower ends of links 166 are shifted towards the opposite end of the carriage, and this causes rods 167 to move ends 171 of bell cranks 118 and 119 in the same direction to lower the adjacent end of the carriage. When piston rod 158 is retracted, this action is reversed to raise the carriage.

When carriage 78 is moved into position over conveyor 40 in holding section 18, tubes 115 and 116 are lowered until their lower surfaces touch the crossbanding core pieces laid in a sheet on conveyor 40. Suction applied to the tubes pulls the core pieces against the lower surfaces thereof. Then tubes 115 and 116 are raised, and the carriage is moved outwardly until the sheet of core pieces is over table 72. The tubes are then lowered to place the sheet of core pieces on top of a veneer panel or sheet lying on the table. When the suction is cutoff from tubes 115 and 116, the latter can be raised so that the carriage is ready to be moved forward again to pick up another layer of core pieces.

The core pieces 26 may be precoated with suitable glue and fed individually into section 12, or glue may be applied onto opposite surfaces thereof in apparatus 10. In this case, gluing unit 16 is provided between trimming section 14 and holding section 18. Conveyor 32 moves the trimmed core pieces in sheets through the gluing unit. This unit includes a housing 178 through which conveyor 32 travels. A plurality of upper nozzles 180 are arranged across housing 178 above the path along which core pieces are moved by conveyor 32, and a plurality of lower nozzles 182 are located below this path, see FIGURE 6. Glue is supplied to these nozzles in any convenient manner, and they are arranged so that they spray the glue on the upper and lower surfaces of core pieces 26 as they travel through housing 178 from trimming section 14.

Trimming section 14 is standard equipment. It includes successive conveyor chains 190 and 191 with chains 190 moving a little faster than chains 191. This crowds the core pieces together in edge to edge relationship. A third set of conveyor chains 193 move the crowded core pieces beneath a rotating knife 194 which is operated at predetermined intervals to cut the core pieces into sheets of desired lengths. If desired, trim saws 195 may be provided for cutting the core pieces to a desired length which determines the width of the sheets.

The operation of assembly apparatus 10 is apparent from the above description. Core pieces 26 are fed into feed section 12 which directs them into trimmer 14 where they are crowded together into a continuous ribbon. Here the ribbon of core pieces is trimmed into sheets of the same dimensions as the veneer sheets that are fed into the apparatus. When a core piece sheet or panel glue thereon is positioned by conveyor 40 within holding section 18, carriage 78 has advanced over said conveyor and tubes 115 and 116 are lowered to pick up the sheet of core pieces. In the meantime, a plywood veneer sheet has been picked up from one of the stacks 66, 67 or 68 by conveyor 20 in the manner described. This sheet is transported to a position over table 72, and when the suction of section 65 of the conveyor is shut off, the sheet drops onto the table. Then carriage 78 moves the core piece sheet over the table, and after tubes 115 and 116 are lowered, the suction is cut off from these tubes so that the core piece sheet is deposited in proper formation onto the veneer sheet positioned on table 72. While carriage 78 reaches out to pick up another core piece sheet and is clear of conveyor 20, a second veneer sheet is picked up by the latter conveyor, transported over table 72, and deposited upon the core piece sheet. This may be continued until the desired number of veneer sheets and core piece sheets are alternately deposited on the table to assemble the laminates for one or more plywood panels.

What I claim as my invention is:

1. Plywood assembly apparatus comprising an endless first suction conveyor adapted consecutively to pick up veneer sheets from at least one stack and to deliver said sheets to a first assembly station, a second assembly station positioned to one side of the first station and upon which crossbanding core pieces are laid in core sheets, and a second reciprocal suction conveyor positioned to reciprocate across said first and second stations, said second conveyor being operable consecutively to pick up said core sheets from the second station and to deposit said core sheets onto the veneer sheets at the first station alternatively to the delivery of said veneer sheets thereto.

2. Plywood assembly apparatus comprising an endless first suction conveyor adapted consecutively to pick up veneer sheets from at least one stack and to deliver said sheets to a first assembly station, a second assembly station positioned to one side of the first station and upon which crossbanding core pieces are laid in core sheets, a plurality of upper and lower glue spray nozzles above and below a path along which the core pieces are moved towards the first station, said nozzles spraying glue onto the upper and lower surfaces of the core pieces as the latter move along said path, and a second reciprocal suction conveyor positioned to reciprocate along said path across said first and second stations, said second conveyor being operable consecutively to pick up said core sheets from the second station and to deposit said core sheets onto the veneer sheets at the first station alternatively to the delivery of said veneer sheets thereto.

3. In plywood assembly apparatus, a conveyor for delivering veneer sheets to an assembly station, comprising a pair of spaced tubes each having a narrow slot in a lower surface and extending longitudinally thereof, at least one endless belt extending around each tube from end to end thereof, each belt having a lower run extending beside the slot in the tube around which said belt extends, means for simultaneously moving the belts around their respective tubes, means for applying suction to the tubes, whereby veneer sheets extending across the lower runs of the belts are retained thereagainst during movement thereof, and means for cutting off the suction from the sheets to release the latter from the belts.

4. In plywood assembly apparatus, a conveyor for delivering veneer sheets to an assembly station, comprising a pair of spaced tubes each having a narrow slot in a lower surface and extending longitudinally thereof, a pair of spaced belts extending around each tube from end to end thereof, the belts of each tube having lower runs beside and on opposite sides of the slot in the tube around which said belts extend, means for simultaneously moving the belts around their respective tubes, means for applying suction to the tubes, whereby veneer sheets extending across the lower runs of the belts are retained thereagainst during movement thereof, and means for cutting off the suction from the sheets to release the latter from the belts.

5. In plywood assembly apparatus, a conveyor for delivering crossbanding core pieces from one assembly station to another assembly station, comprising track means extending over said stations, a carriage movably mounted on said track means, power means for reciprocating the carriage on the track means between the first and second stations, a pair of spaced tubes movably suspended from the carriage each having a narrow slot in a lower surface and extending longitudinally thereof, means for shifting said tubes up and down relative to the carriage, means for applying suction to the tubes whereby core pieces extending across the lower surfaces thereof are retained thereagainst during movement of the carriage, and means for cutting off the suction from the core pieces to release the latter from the tubes.

6. In plywood assembly apparatus, a suction conveyor for delivering crossbanding core pieces to a first assembly station from a second assembly station, comprising first track means extending over the first station towards the second station, second track means extending from first track means over the second station, a carriage movably mounted on the first track means, tube means movably suspended near one end of the carriage, supporting means slidably mounted on said second track means and connected to and carrying opposite ends of said tube means, power means connected to the carriage for reciprocating said tube means along the first and second track means between positions over the first and second stations, opening means in said tube means and facing downwardly therefrom, means for shifting said tube means up and down relative to the carriage and said supporting means over each of the first and second stations, said tube means engaging core pieces when the tube means is shifted down in the second station, and means for selectively applying and cutting off suction to and from said tube means.

7. Apparatus as claimed in claim 6 in which said tube means comprises a pair of tubes connected at one end to a base mounted on the carriage for vertical movement relative thereto, and said opening means comprises a slot in and extending longitudinally of a lower surface of each tube.

8. Apparatus as claimed in claim 7 in which said supporting means comprises a hanger slidably mounted on and hanging down from the second track means and swingably connected to an adjacent end of each tube.

9. Apparatus as claimed in claim 7 in which said means for shifting the tube means up and down relative to the carriage comprises crank means swingably connected to said base and the carriage, and power means on the carriage and connected to said crank means to rotate the latter back and forth to raise and lower the base and the tubes connected thereto.

10. Apparatus as claimed in claim 8 in which said means for shifting the tube means up and down relative to said supporting means comprises a bell crank pivotably connected to said opposite end of each tube and having a first end pivotally connected to the adjacent hanger and a second end near said each tube, power means on the carriage, and linkage from said power means and extending along said each tube and pivotally connected to said second end of the bell crank for swinging said crank back and forth to raise and lower the end of said each tube.

11. Apparatus as claimed in claim 9 in which said means for shifting the tube means up and down relative to said supporting means comprises a bell crank pivotably connected to said opposite end of each tube and having a first end pivotally connected to the adjacent hanger and a second end near said each tube, and linkage from said crank means and extending along said each tube and pivotally connected to said second end of the bell crank for swinging said crank back and forth when the crank means is rotated by said power means to raise and lower the end of said each tube as said base is raised and lowered.

12. Apparatus as claimed in claim 6 including another suction conveyor extending substantially at right angles to and above said first track means and over said first assembly station, said another conveyor being adapted consecutively to pick up veneer shetts from at least one stack and to deliver said sheets to the first station when said tube means is positioned over said second sation.

13. Apparatus as claimed in claim 12 in which said another conveyor comprises a pair of spaced tubes each having a narrow slot in the lower surface and extending longitudinally thereof, at least one endless belt extending around each tube from end to end thereof, each belt having a lower run extending beside the slot in the tube around which said belt extends, means for simultaneously moving the belts around their respective tubes, means for applying suction to the tubes, whereby veneer sheets extending across the lower runs of the belts are retained thereagainst during movement thereof, and means for cutting off the suction from the sheets to release the latter from the belts when over the first assembly station.

14. Apparatus as claimed in claim 12 in which said another conveyor comprises a pair of spaced tubes each having a narrow slot in a lower surface and extending longitudinally thereof, a pair of spaced belts extending around each tube from end to end thereof, the belts of each tube having lower runs beside and on opposite sides of the slot in the tube around which said belts extend, means for simultaneously moving the belts around their respective tubes, means for applying suction to the tubes, whereby veneer sheets extending across the lower runs of the belts are retained thereagainst during movement thereof, and means for cutting off the suction from the sheets to release the latter from the belts when over the first assembly station.

15. Plywood assembly apparatus comprising a first conveyor adapted consecutively to pick up veneer sheets from at least one stack and to deliver said sheets to an assembly station; said first conveyor comprising a pair of spaced tubes each having a narrow slot in the lower surface and extending longitudinally thereof, at least one endless belt extending around each tube from end to end thereof, each belt having a lower run extending beside the slot in the tube around which said belt extends, means for simultaneously moving the belts around their respective tubes, means for applying suction to the tubes, whereby veneer sheets extending across the lower runs of the belts are retained thereagainst during movement thereof, and means for cutting off the suction from the sheets to release the latter from the belts when over the assembly station; means for assemblying crossbanding core pieces into core sheets and trimming said sheets to a predetermined size, conveyor means for moving the core sheets through a gluing unit, said unit including means for spraying glue on to opposite surfaces of the core sheets, means for moving the sprayed core sheets into a holding section, and a second conveyor adapted consecutively to pick up assembled core sheets in the holding section and to deposit said core sheets on to the veneer sheets at the assembly station alternatively to the delivery of said veneer sheets thereto.

16. Plywood assembly apparatus as claimed in claim 15 in which there are a pair of spaced endless belts extending around each tube, the lower runs of which are positioned on opposite sides of the slot of said each tube.

17. Plywood assembly apparatus comprising a first conveyor adapted consecutively to pick up veneer sheets from at least one stack and to deliver said sheets to an assembly station, means for assembling crossbanding core pieces into core sheets and trimming said sheetts to a predetermined size, conveyor means for moving the core sheets through a gluing unit, said unit including means for spraying glue on to opposite surfaces of the core sheets, means for moving the sprayed core sheets into a holding section, and a second conveyor adapted consecutively to pick up assembled core sheets in the holding section and to deposit said core sheets on to the veneer sheets at the assembly station alternatively to the delivery of said veneer sheets thereto; said second conveyor comprising track means extending over the assembly station and the holding section, a carriage movably mounted on said track means, power means for reciprocating the carriage on the track means between the assembly station and the holding section, a pair of spaced tubes on the carriage each having a narrow slot in a lower surface and extending longitudinally thereof, means for applying suction to the tubes when in the holding section to draw a core sheet against the lower surfaces of the tubes, and means for cutting off the suction from the tubes to release the core sheet in the assembly station.

18. Plywood assembly apparatus as claimed in claim 17 including means for shifting said tubes up and down relative to the carriage.

References Cited

UNITED STATES PATENTS

| | | | |
|---|---|---|---|
| 3,367,823 | 2/1968 | Clausen et al. | 156—281 |
| 1,870,041 | 8/1932 | Dike | 118—308 X |
| 3,133,850 | 5/1964 | Alenius | 156—558 |
| 3,259,417 | 7/1966 | Chapman | 294—64 |

EARL M. BERGERT, *Primary Examiner.*

M. L. KATZ, *Assistant Examiner.*

U.S. Cl. X.R.

156—559, 572